US007323500B2

(12) United States Patent
Schindler et al.

(10) Patent No.: US 7,323,500 B2
(45) Date of Patent: Jan. 29, 2008

(54) AQUEOUS LEATHER TREATMENT COMPOSITION AND METHOD OF USE

(75) Inventors: Frederick J. Schindler, Fort Washington, PA (US); Edwin H. Nungesser, Horsham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 591 days.

(21) Appl. No.: 10/858,335

(22) Filed: Jun. 1, 2004

(65) Prior Publication Data

US 2004/0241467 A1 Dec. 2, 2004

Related U.S. Application Data

(60) Provisional application No. 60/475,167, filed on Jun. 2, 2003.

(51) Int. Cl.
*C08K 7/22* (2006.01)

(52) U.S. Cl. ....................................... 523/218; 523/201

(58) Field of Classification Search ................ 523/201, 523/218

See application file for complete search history.

(56) References Cited

U.S. PATENT DOCUMENTS

| | | | |
|---|---|---|---|
| 4,325,856 | A | 4/1982 | Ishikawa et al. |
| 4,427,835 | A | 1/1984 | Bush et al. |
| 4,468,498 | A | 8/1984 | Kowalski et al. |
| 4,469,825 | A | 9/1984 | Kowalski et al. |
| 4,594,363 | A | 6/1986 | Blankenship et al. |
| 4,654,397 | A | 3/1987 | Mueller-Mall et al. |
| 4,814,373 | A | 3/1989 | Frankel et al. |
| 4,880,842 | A | 11/1989 | Kowalski et al. |
| 4,920,160 | A | 4/1990 | Chip et al. |
| 4,923,732 | A | 5/1990 | Schaefer |
| 4,985,064 | A | 1/1991 | Redlich et al. |
| 5,036,109 | A | 7/1991 | Chip et al. |
| 5,041,464 | A | 8/1991 | Hoshino et al. |
| 5,157,084 | A | 10/1992 | Lee et al. |
| 5,409,776 | A | 4/1995 | Someya et al. |
| 5,510,422 | A | 4/1996 | Blankenship et al. |
| 5,723,182 | A | 3/1998 | Choi et al. |
| 6,139,961 | A | 10/2000 | Blankenship et al. |
| 6,284,836 | B1 | 9/2001 | Hassel et al. |
| 6,290,866 | B1 | 9/2001 | Lesko et al. |
| 6,387,211 | B1 | 5/2002 | Chakar et al. |
| 6,471,885 | B2 | 10/2002 | Chiang et al. |

FOREIGN PATENT DOCUMENTS

| | | |
|---|---|---|
| EP | 1 279 746 A1 | 1/2003 |
| ES | 8705923 | 12/1985 |

OTHER PUBLICATIONS

Dieterich; "Aqueous Emulsions, Dispersions, And Solutions Of Polyurethanes; Synthesis And Properties", Progress in Organic Coatings, 9 (1981), pp. 281-340.

*Primary Examiner*—Peter Szekely

(57) ABSTRACT

An aqueous leather treatment composition is provided containing select soft polymer particles and water-filled voided particles. Also provided are a method for preparing an embossed coated leather substrate, which includes the application of the aqueous leather treatment composition, as well as an article prepared from the embossed coated leather substrate.

12 Claims, No Drawings

AQUEOUS LEATHER TREATMENT COMPOSITION AND METHOD OF USE

CROSS REFERENCE TO RELATED PATENT APPLICATIONS

This is a non-provisional application of prior pending U.S. provisional application Ser. No. 60/475,167 filed Jun. 2, 2003.

This invention relates to an aqueous leather treatment composition suitable for providing embossed coated leather. The aqueous leather treatment composition contains soft polymer particles and water-filled voided particles. Also provided are a method of preparing an embossed coated leather substrate and an embossed coated leather substrate.

Embossing is the process of imprinting a pattern into the surface of a substrate and is often employed to improve the aesthetic appearance of leather. In the leather embossing process, a pattern is transferred to the leather surface by bringing a steel plate or roller having an engraved pattern in contact with the surface of the leather at elevated temperature and pressure for a short time. Typically, the leather surface is coated prior to the embossing step. If the leather coating has high elasticity, it will tend to rebound to its original shape when the pressure is released, resulting in poor transfer of the detail in the engraved pattern. If the leather coating has low elasticity, it tends to stick to the embossing plate or roller, and tear where it is stretched in the valleys of the pattern, referred to as "cut". Often the leather is milled after embossing, which can result in additional loss of detail if the coating has not permanently deformed during embossing. Leather coatings are desired that provide coated leather with improved embossing characteristics, especially a combination of increased retention of fine print detail together with increased resistance to cutting in the valleys in deep prints.

Spanish Patent Application No. 551053 discloses a method of preparing embossed leather and artificial leather involving the application of a coating containing a plurality of pre-formed hollow microspheres filled with a gas. The reference discloses that the mean size of the hollow microspheres is 5 to 15 microns in diameter. The disclosed method is intended to provide coatings on leather and artificial leather with properties such as flexibility, tensile strength, water vapor transmission, and coverage to permit concealment of flaws in the leather or artificial leather substrate. A problem with the use of gas filled hollow microspheres in coating compositions is the tendency of these microspheres to separate from the other components in the coating compositions. The gas filled microspheres have lower densities than the other components or the liquid phase, and float to the top of the coating composition. If the gas filled hollow microspheres are not well distributed within the coating composition, coatings prepared from the coating composition will have nonuniform appearances. Further, since coatings on leather are not much thicker than the mean size of the gas filled hollow microspheres, the microsphere will cause both mechanical and visual defects in the coatings.

The problem faced by the inventors is the provision of a method for preparing embossed coated leather with improved embossing characteristics.

The inventors have found aqueous leather treatment compositions that provide coated leather having improved embossing characteristics. The aqueous leather treatment compositions of this invention containing select soft polymer particles and select water-filled voided particles dispersed in an aqueous medium. The select water-filled voided particles remain distributed within the aqueous leather treatment compositions. Coated leather prepared from these aqueous leather treatment compositions has improved embossing characteristics, as is desired in the art. Also provided is a method for preparing embossed coated leather.

According to the first aspect of the present invention, an aqueous leather treatment composition is provided containing: soft polymer particles selected from soft polyurethane polymer particles having a glass transition temperature of less than or equal to 20° C., soft addition polymer particles having a glass transition temperature in the range of from −70° C. to 10° C., or combinations thereof; and water-filled voided particles having an average particle diameter in the range of from 0.1 to 4 micron; wherein the aqueous leather treatment composition has a ratio of dry weight of the soft polymer particles to dry weight of the water-filled voided particles in the range of from 19:1 to 3:2.

A second aspect of the present invention provides a method for preparing an embossed coated leather substrate, including the steps of: applying an aqueous leather treatment composition to a leather substrate, wherein the aqueous leather treatment composition contains: soft polymer particles selected from: soft polyurethane polymer particles having a glass transition temperature of less than or equal to 20° C., soft addition polymer particles having a glass transition temperature in the range of from −70° C. to 10° C., or combinations thereof; and water-filled voided particles having an average particle diameter in the range of from 0.1 micron to 4 micron; wherein the aqueous leather treatment composition has a ratio of dry weight of the soft polymer particles to dry weight of the water-filled voided particles in the rang of from 19:1 to 3:2; drying or allowing to dry the aqueous leather treatment composition that is applied to the leather substrate to provide a coated leather substrate having a coated surface; contacting the coated surface of the coated leather substrate and an engraved surface; applying pressure to interface of the coated surface in contact with the engraved surface; and removing from contact the engraved surface and the coated surface to provide the embossed coated leather substrate.

A third aspect of the present invention is directed towards an embossed coated leather substrate including: a leather substrate; and a coating prepared from an aqueous leather treatment composition containing: soft polymer particles selected from: soft polyurethane polymer particles having a glass transition temperature of less than or equal to 20° C., soft addition polymer particles having a glass transition temperature in the range of from −70° C. to 10° C., or combinations thereof; and water-filled voided particles having an average particle diameter in the range of from 0.1 to 4 micron; wherein the aqueous leather treatment composition has a ratio of dry weight of the soft polymer particles to dry weight of the water-filled voided particles in the range of from 19:1 to 3:2.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$, and $w_2$ refer to the weight fraction of the two comonomers, and $T_{g(1)}$ and $T_{g(2)}$ refer to the glass transition temperatures of the two corresponding homopolymers in Kelvin. For polymers containing three or more monomers, additional terms are added ($w_n/T_{g(n)}$). The $T_g$ of a polymer phase can also be calculated by using the appropriate values for the glass transition temperatures of homopolymers, which may be found, for example, in "Polymer Handbook", edited by J. Brandrup and E. H. Immergut, Interscience Publishers. The values of $T_g$ reported herein for the soft addition polymer particles are calculated using the Fox equation. The values of $T_g$ reported herein for the soft polyurethane polymer particles are measured using differential scanning calorimetry.

As used herein, the use of the term "(meth)" followed by another term such as acrylate refers to both acrylates and methacrylates. For example, the term "(meth)acrylate" refers to either acrylate or methacrylate; the term "(meth) acrylic" refers to either acrylic or methacrylic; and the term "(meth)acrylamide" refers to either acrylamide or methacrylamide.

The present invention relates to an aqueous leather treatment composition suitable for use in coating leather and a method for preparing an embossed coated leather substrate, including the step of applying this aqueous leather treatment composition. The aqueous leather treatment composition contains select soft polymer particles and select water-filled voided particles dispersed in an aqueous medium.

The aqueous leather treatment composition contains soft polymer particles selected from soft polyurethane polymer particles, soft addition polymer particles, or combinations thereof. The mean diameter of the select soft polymer particles is typically in the range of from 50 nanometers (nm) to 500 nm, preferably in the range of from 80 nm to 350 nm, and more preferably, in the range of from 80 nm to 200 nm. The select soft polymer particles are characterized as having a glass transition temperature of less than or equal to 20° C. Addition polymers contain ethylenically unsaturated monomers as polymerized units. The aqueous leather treatment composition typically contains from 5 to 60 weight % of the select soft polymer particles, based on the weight of solids in the aqueous leather treatment composition.

In one embodiment, the aqueous leather treatment composition contains soft polyurethane polymer particles as the select soft polymer particles. Suitable soft polyurethane polymer particles are made by polymerizing polyester, polycarbonate, or polyether diols with an excess of aliphatic diisocyanate, alone with ionic or nonionic dispersing functionality. In one process, a polyurethane prepolymer is dispersed in water and chain extended by reaction with diamine to prepare the soft polyurethane polymer particles. In another process, a soft polyurethane polymer is prepared at high molecular weight in acetone, dispersed in water, and the acetone is removed to provide the soft polyurethane polymer particles. These processes and other processes are discussed in P. Pieterich, *Aqueous Emulsion, Dispersion and Solutions of Polyurethanes; Synthesis and Properties* in Progress in Organic Coatings 9 (1981) 281-340. Examples of aliphatic diisocyanates suitable for preparing the soft polyurethane polymer particles include hexamethylene diisocyanate, isophorone diisocyanate, and 4,4'dicyclohexylmethane diisocyanate. The soft polyurethane polymer particles have glass transition temperatures of less than or equal to 20° C. and preferably in the range of from −70 to 20° C. The weight average molecular weight of the soft polyurethane polymer particles is typically at least 10,000. The soft polyurethane polymer particles useful in the aqueous leather treatment composition of this invention are typically provided as aqueous dispersions.

In other embodiments, the aqueous leather treatment composition contains select soft polymer particles that are soft addition polymer particles with glass transition temperatures in the range of from −70° C. to 10° C., preferably in the range of from −60° C. to 10° C., and more preferably in the range of from −45° C. to 10° C. These addition polymers are prepared by polymerization of at least one ethylenically unsaturated monomer. Examples of suitable ethylenically unsaturated monomers include (meth)acrylates such as $C_1$ to $C_{24}$ alkyl(meth)acrylates, hydroxyalkyl(meth) acrylates, and ionic (meth)acrylates such as acid containing (meth)acrylates, amine containing (meth)acrylates, and amide containing (meth)acrylates. Suitable $C_1$ to $C_{24}$ alkyl (meth)acrylates include methyl(meth)acrylate, ethyl(meth) acrylate, butyl(meth)acrylate, 2-ethylhexyl(meth)acrylate, decyl(meth)acrylate, lauryl(meth)acrylate, and stearyl (meth)acrylate. Suitable hydroxyalkyl(meth)acrylates include hydroxyethyl(meth)acrylate and hydroxypropyl (meth)acrylate. Examples of other suitable ethylenically unsaturated monomers are acid containing monomers including acid containing (meth)acrylates such as, for example, (meth)acrylic acid and phosphoethyl(meth)acrylate; difunctional acids such as itaconic acid; maleic acid, as well as anhydrides such as maleic anhydride, which form acids in the presence of water. Other suitable ethylenically unsaturated monomers include styrene; substituted styrenes such as alpha-methyl styrene; vinyl acetate or other vinyl esters; vinyl monomers such as vinyl chloride, vinylidene chloride, N-vinyl pyrrolidone; and (meth)acrylonitrile. Still other suitable ethylenically unsaturated monomers include multiethylenically unsaturated monomers such as, for example, allyl(meth)acrylate, diallyl phthalate, 1,4-butylene glycol di(meth)acrylate, 1,2-ethylene glycol di(meth)acrylate, 1,6-hexanediol di(meth)acrylate, and divinyl benzene; and crosslinking monomers such as methylol(meth)acrylamide, acetoacetate monomers, and acetoacetamide monomers. Examples of acetoacetate monomers include vinyl acetoacetate, acetoacetoxyethyl (meth)acrylate, acetoacetoxypropyl(meth)acrylate, allyl acetoacetate, aetoacetoxybutyl(meth)acrylate, and 2,3-di)acetoacetoxy)propyl(meth) acrylate. Examples of acetoacetamide monomers include vinyl acetoacetamide and acetoacetoxyethyl(meth)acrylamide.

The soft addition polymer particles are typically prepared by aqueous emulsion polymerization processes, which are well known in the art. In the aqueous emulsion polymerization process, conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. the amount of surfactant used is usually in the range of from 0.1 to 6% by weight, based on the weight of monomer. Either thermal or redox initiation processes may be used. The monomer mixture may be added neat or as an emulsion in water. The monomer mixture may be added in one or more additions or continuously over the reaction period allotted. Conventional free radical initiators may be used such as, for example, hydrogen peroxide, t-butyl hydroperoxide, ammonium and/or alkali persulfates, typically at a level of from 0.01 to 3% by weight, based on the weight of the total monomer. Redox systems using the same initiators coupled with a suitable reductant such as, for example, sodium sulfoxylate formaldehyde, sodium hydrosulfite, isoascorbic acid, and sodium bisulfite may be used at similar levels. Chain transfer agents such as mercaptans may be used to lower the molecular weight of the polymer. The weight average molecular weight of the soft addition polymer particles is typically at least 50,000.

In one further embodiment, the aqueous leather treatment composition contains soft addition polymer particles having a glass transition temperature in the range of from −20° C. to 10° C. These soft addition polymer particles have an average particle diameter in the range of from 80 to 180 nm. The aqueous leather treatment composition of this embodiment contains soft addition polymer particles containing copolymerized (meth)acrylic monomer, (meth)acrylonitrile, and styrene; soft addition polymer particles containing copolymerized butadiene, (meth)acrylonitrile, and styrene; or combinations thereof.

In one still further embodiment, the aqueous leather treatment composition includes soft addition polymer particles containing from 0.5 to 10 weight %, preferably from 1 to 5 weight %, and more preferably from 2 to 3.5 weight % copolymerized carboxylic acid monomers. Carboxylic acid monomers are ethylenically unsaturated monomer that contain at least one carboxylic acid group, and include, for example, (meth)acrylic acid, itaconic acid, maleic acid, as well as anhydrides such as maleic anhydride. The aqueous leather treatment composition of this embodiment is prepared by contacting the soft polymer particles containing copolymerized carboxylic acid monomer with a transition metal oxide, transition metal hydroxide, or transition metal carbonate at a pH less than 9, preferably at a pH in the range of from 3 to 6, in an amount that is greater than 0.2 equivalent, preferably greater than 0.5 equivalent, of the transition metal per equivalent of the copolymerized carboxylic acid monomers in the polymer particles. The oxides, hydroxides, and the carbonates of zinc, aluminum, tin, tungsten, and zirconium are preferred for low cost, low toxicity, and low color in the dried coating. Zinc oxide is preferred. The transition metal oxide, hydroxide, or carbonate may be added slurried in water, optionally with an added dispersant such as, for example, a low molecular weight polymer or copolymer of (meth)acrylic acid. The transition metal oxide, hydroxide, or carbonate may be added during the polymerization process of after the polymerization has been completed. Alternatively, the transition metal may be added in a soluble form such as a solution of zinc ammonium carbonate added after the formation of the dispersion containing the soft polymer particles and neutralization of the soft polymer particle dispersion to a pH greater than 8. The soft addition polymer particles of this embodiment have a glass transition temperature in the range of from −70° C. to zero ° C., and preferably in the range of from −70° C. to −7° C.

In a still furthermore embodiment, the aqueous leather treatment composition contains soft addition polymer particles that are prepared in a multistage polymerization process in which two or more polymeric stages varying in composition are prepared in sequential fashion. The polymerization techniques used to prepare such aqueous multistage polymer particles are well known in the art, such as, for example, U.S. Pat. Nos. 4,325,856, 4,654,397, and 4,814,373. The multistage addition polymer particles of this embodiment are prepared by forming a predominantly (meth)acrylic first stage polymer with a glass transition temperature in the range of from −70° C. to zero ° C.; and forming a second stage polymer having a glass transition temperature of at least 20° C., preferably in the range of from 20° C. to 150° C. The weight of the second stage polymer is in the range of from 10 to 25% of the weight of the first stage polymer, based on dry polymer weight. As used herein, "predominantly (meth)acrylic first stage polymer" means that the first stage polymer contains as polymerized units greater than 50 weight % (meth)acrylic monomers, based on the dry weight of the first stage polymer. Preferably the first stage polymer has a glass transition temperature in the range of from −70° C. to −7° C.

The aqueous leather treatment composition also contains water-filled voided particles dispersed in the aqueous medium. The water-filled voided particles are polymer particles that contain a polymer shell including at least one internal void space within the particle. Optionally, the internal void may be connected to the exterior of the particle by at least one channel. As used herein, the term "water-filled" indicates that the internal void contains water and optionally other liquid or water soluble components of the aqueous medium. The water-filled voided particles have a density similar to the density of the aqueous medium. In contrast to gas filled voided particles, the water-filled voided particles have little or no tendency to float to the top of the aqueous leather treatment composition. The average particle diameter of the water-filled voided particles is in the range of from 0.1 to 4 micron, preferably in the range of from 0.3 to 2 micron, and more preferably, in the range of from 0.4 to 1.2 micron. The water-filled void volume is typically in the range of from 10 to 70 volume % and preferably in the range of from 20 to 60 volume % of the total volume of the water-filled voided particles. The polymer shell may be one or more layers of any addition polymer or combination of addition polymers, including polymers containing copolymerized styrene and (meth)acrylate monomers. The water-filled voided polymer particles useful in this invention can be produced by multi-stage sequential emulsion polymerization techniques. In one embodiment, the water-filled voided particles have a glass transition temperature of at least 60° C., and preferably in the range of from in the range of from 60° C. to 120° C. In a different embodiment, the water-filled voided particles have an outer polymer shell with a glass transition value in the range of −50° C. to −10° C. Suitable water-filled voided particles are disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; U.S. Pat. No. 5,510,422, and U.S. Pat. No. 6,139,961.

In one embodiment, the aqueous leather treatment composition contains the soft polymer particles, the water-filled voided particles, and hard polymer particles. The hard polymer particles are characterized as having a glass transition temperature in the range of from 40° C. to 150° C., and preferably in the range of from 40° C. to 150° C. The average particle diameter of the hard polymer particles is typically in the range of from 10 nm to 500 nm. Suitable amounts of the hard polymer particles in the aqueous leather treatment composition is from 5 to 30 weight %, preferably from 10 to 25 weight %, based on the total weight of the soft polymer particles and the hard polymer particles.

The aqueous leather treatment composition optionally contains other ingredients such as flow additives; leveling agents; surfactants; coalescing agents; buffers; neutralizers; thickeners; humectants; wetting agents; biocides; plasticizers; antifoaming agents; colorants; dulling agents such as silica; clays; solvents such as isopropanol or methoxypropanol, anti-tack auxiliaries such as starch, casein, and waxes; and anti-oxidants. Suitable levels of solvent in the aqueous leather treatment composition include from 0 to 5 weight % solvent, based on the weight of the aqueous leather treatment composition.

The solids content of the aqueous leather treatment composition is typically in the range of from 10 to 50% by volume. The viscosity of the aqueous leather treatment composition may be from 0.02 to 10 Pascal-seconds (20 to 10,000 centipoise), as measured using a Brookfield viscometer; the viscosities appropriate for different application methods vary considerably. The pH of the aqueous leather treatment composition is typically in the range of from 6 to 10.

The aqueous leather treatment composition may be applied to leather such as, for example, mineral tanned or vegetable tanned leather including full-grain leather, buffed or corrected-grain leather, and split leather with or without a prior treatment with an impregnating resin mixture and with or without the application of subsequent coatings. The leather may receive a smooth or hair cell embossing prior to coating with the aqueous leather treatment composition to provide a flat surface for coating or to reduce the porosity of buffed or split leather.

Suitable application methods to apply the aqueous leather treatment composition include conventional coatings application methods such as, for example, curtain coating and spraying methods such as, for example air-atomized spray, air-assisted spray, airless spray, high volume low pressure spray, and air-assisted airless spray. Typical application rates of the aqueous leather treatment composition are in the range of from 0.2 to 75 grams dry weight per square meter ($g/m^2$). The aqueous leather treatment composition applied to the leather substrate is typically dried, or allowed to dry at a temperature in the range of from 20° C. to 100° C. to provide a coated leather substrate having a dried coating of the aqueous leather treatment composition on at least one surface of the leather substrate. Water is removed from the internal void of the water-filled voided particle during the drying step.

An embossed coated leather substrate is prepared by embossing the coated leather substrate using a suitable embossing process, such as a hydraulic plate embossing process or a roller embossing process. In the embossing process, the coated surface of the coated leather substrate is contacted with an engraved surface to transfer the pattern of the engraved plate to the coated leather substrate. In the hydraulic plate embossing process, the engraved surface is a steel plate having an engraved pattern, which is contacted with the coated surface of the coated leather substrate under conditions of temperature and pressure. Typical embossing conditions using hydraulic plate embossing are contact times in the range of from 0.5 to 7 seconds; temperatures in the range of from 80 to 130° C.; and pressures less than or equal to 25 MPa (approximately 250 bar). In the roller embossing process, the engraved surface is a steel roll having an engraved pattern on the surface of the roll, which is contacted with the coated surface of the coated leather substrate under conditions of temperature and pressure. Typical embossing conditions using roller embossing are temperatures in the range of from 80 to 130° C., pressures less than or equal to 80 MPa (approximately 800 bar), and roll speeds of 3 to 10 meters per minute. The embossed coated leather substrate prepare by the method of this invention, which includes the use of the aqueous leather treatment composition of this invention, has improved embossed characteristics, such as one or more of the following: better print definition, improved embossed detail, particularly retention of fine detail, reduced sticking to the engraved surface, and less tearing of the coating, especially in the valleys of the embossed coated leather substrate.

After the embossing step, the embossed coated leather substrate may be either milled or staked to restore some of the original thickness or softness of the coated leather substrate.

The aqueous leather treatment composition may be applied as a basecoat to the leather substrate. The basecoat composition contains the soft polymer particles, the water-filled voided particles, pigment, and optionally, other additives. One or more basecoats may be applied with drying between each basecoat. A topcoate is typically applied to the last basecoat. The coated leather substrate may be embossed between basecoats after the final basecoat, or after the topcoat. It is only necessary that one of the vasecoate layers applied before embossing uses the aqueous leather treatment composition of this invention. A typical application rate for the basecoat is approximately 35 $g/m^2$, based on dry weight. Typical application rates for the topcoat are approximately 2 to 20 $g/m^2$, based on dry weight.

The embossed coated leather substrate may be used in the preparation of a variety of articles such as shoes, garments, furniture, and automobile upholstery.

The average particle diameters of the soft polymer particles and the water-filled voided particles are measured by a quasielastic light scattering technique, such as provided, for example, by the Model BI-90 Particle Sizer, of Brookhaven Instruments Corp. A dispersion containing the soft polymer particles or the water-filed voided particles may have an unimodal or a multimodal, including a bimodal, particle size distribution.

The following examples are presented to illustrate the composition and the process of the invention. These examples are intended to aid those skilled in the art in understanding the present invention. The present invention is, however, in no way limited thereby.

Test Methods to Evaluate the Embossed Coated Leather Samples

Cling: Cling is the ability to remove the coated leather from the embossing plate after the embossing step. Coated samples that do not cling to the embossing plate are characterized as not adhering to the embossing plate after the embossing step. Cling is rate on the following scale:

5 does not adhere
4 adheres slightly
3 adheres moderately
2 adheres severely
1 difficult to remove from plate A rating for cling of 3 and above is considered acceptable.

Print Definition: The print definition is the distinctness and the sharpness of the pattern embossed into the coated leather sample. The samples were evaluated on a relative scale with the sample having an embossed pattern with the distinctness and sharpness features being rated the highest number, and the sample having an embossed pattern with the least distinct and sharp features being rated a value of one.

Cutting: Cutting is the ability to receive deep prints without tearing the coating. Cutting is rated according to the following scale:

5 no cutting is observed
4 10 to <30% of valleys are cut
3 30 to <50% of valleys are cut
2 50 to <80% of valleys are cut
1 80 to 100% of valleys are cut Samples having a rating of 4 and above for cutting are considered acceptable.

Materials

Euderm™ White D-CB aqueous pigment (Bayer Corp.)

Euderm™ AN01 matting agent (Bayer Corp.)

Euderm™ Nappasoft S anti-tack agent (Bayer Corp.)

Jet Black pigment (PP-14-889) (Stahl USA)

Primal™ SB-300 polymer dispersion (Rohm and Haas Company, Philadelphia); $T_g$=−40° C.; 35 wt. % solids.

Ropaque™ HP-1055 pigment—(Rohm and Haas Company); 1 micron diameter with 0.55 volume % void. $T_{g>}$60° C.; 26.5 wt %.

Ropaque™ OP-96 pigment—(Rohm and Haas Company); 0.5 micron diameter with 43 volume % void. $T_{g>}$60° C.; solids Dow 722 HS plastic pigment dispersion (Dow Chemical Corp.); aqueous dispersion containing styrene copolymer particles with average diameter of 0.5 micron, supplied at 50 wt. % solids; $T_{g>}$60° C.

Acrysol™ TT-935 rheology modifier (Rohm and Haas Company)—30 weight %.

Acrysol™ RM-1020 rheology modifiers (Rohm and Haas Company).

EXAMPLE 1

Preparation of Aqueous Leather Treatment Compositions

EXAMPLE 1.1

The aqueous leather treatment composition of Example 1.1 was prepared by admixing 19.0 g of Euderm™ White D-CB aqueous pigment, 10.0 g water, 3.0 g isopropanol, 9.0 g Euderm™ AN01 matting agent, 9.0 g Euderm™ Nappasoft S anti-tack agent, 46.3 g Primal™ SB-300 polymer dispersion, 10.8 g HP-1055 dispersion, 2.3 g additional water, and 1 g of Rhoplex™ TT-935 rheology modifier diluted to 10 wt. % solids.

EXAMPLE 1.2

The aqueous leather treatment composition of Example 1.2 was prepared according to the general procedure for Example 1.1 except that 9.5 g of Ropaque™ OP-96 dispersion was used in place of the Ropaque™ HP-1055 dispersion and the amount of additional water was 3.7 g.

Comparative A

The comparative aqueous leather treatment composition of Comparative A was prepared according to the general procedure for Example 1.1 except that 5.7 g of Dow 722 dispersion (50 wt. %) was used in place of the Ropaque™ HP-1055 dispersion and the amount of the additional water was 7.4 g. The Dow 722 dispersion contained solid bead polymer particles that did not contain voids.

Comparative B

The comparative aqueous leather treatment composition of Comparative B was prepared by admixing 19.0 g of Euderm™ White D-CB aqueous pigment, 10.0 g water, 3.0 g isopropanol, 9.0 g Eudemm™ SN10 matting agent, 9.0 g Euderm™ Nappasoft S anti-tack agent, 54.5 g Primal™ SB-300 polymer dispersion, 4.9 g additional water, and 1 g of Rhoplex™ TT-935 rheology modifier (at 10 wt. %).

EXAMPLE 2

Preparation of Embossed Coated Leather Substrates

The leather samples were GST corrected grain and had area of approximately 930 cm$^2$. The aqueous leather treatment composition was spray applied in two coats at application rates of approximately 0.018 g/cm$^2$ and approximately 0.007 g/cm$^2$, respectively. The coated sample was dried for 2 minutes at 93° C. after the application of each coating. Each coated leather sample was cut in half and then placed in a hotbox at 49° C.

After one hour in the hotbox, one sample half was embossed with a course hair cell plate using conditions of 2 seconds contact time at a pressure of 70.3 kg/cm$^2$ and a temperature of 99° C.

TABLE 2.1

Evaluation of Embossing of Coated Leather Samples and Comparative Coated Leather Samples

| | Ex. 1.1 | Ex. 1.2 | Comp. A | Comp. B |
|---|---|---|---|---|
| Cling | 4 | 3 | 3 | 3 |
| Print Definition | 4 | 3 | 1 | 2 |

The results in Table 2.1 show that the aqueous leather treatment compositions of Examples 1.1 and 1.2, which contained water-filled voided particles provided embossed coated leather having acceptable cling and acceptable levels of print. In particular, the print definition of the embossed coated leather prepared from Examples 1.1 and 1.2 had increase distinctness and sharpness compared to the comparative aqueous leather treatment compositions of Comparative A and B, which did not contain water-filled voided particles.

EXAMPLE 3

Preparation of Aqueous Leather Treatment Compositions

EXAMPLE 3.1

The aqueous leather treatment composition of Example 3.1 was prepared by admixing 320 g water, 640 g Jet Black pigment (PP-14-889), 256 g Euderm™ Nappasoft S anti-tack agent, and 256 g Eudemm™ AN01 matting agent to prepare a premix. To the premix was added 1280 g Primal™ SB-300 polymer dispersion, 422.6 g Ropaque™ HP-1055 dispersion, 25.92 g water, and 57 g of Rhoplex™ TT-935 rheology modifier.

Comparative C

The comparative aqueous leather treatment composition of Comparative C was prepared according to the general procedure for Example 3.1. To the premix was added 1600 g of the Primal™ SB-300 polymer dispersion, 128 g water, and 87 g Acrysol™ RM-1020 rheology modifier. Comparative C did not contain water-filled voided particles.

EXAMPLE 4

Preparation of Embossed Coated Leather Substrates

The aqueous leather treatment composition was spray applied in two coatings at an application rate of approximately 0.0042 g/cm$^2$ per coating (dry weight). The coated samples were dried for at least 30 minutes at 50° C. after the application of each coating. The coated samples were further dried at ambient conditions for 5 days prior to embossing. Comparative coated samples were prepared using the comparative aqueous leather treatment composition of Comparative C.

The coated samples were roll embossed using a commercial roll embosser. The embossing conditions were a temperature of 97° C., a pressure of 15 MPa, and a belt speed of 7 meters per minute. The embossed samples were evaluated for cling, print definition, and cutting.

TABLE 4.1

Evaluation of Embossing of Coated Leather Samples and Comparative Coated Leather Samples

| Sample | Cling | Print Definition | Cutting |
|---|---|---|---|
| Example 3.1 | 5 | 2 | 4 |
| Comparative C | 5 | 1 | 1 |

The results in Table 4.1 show that the aqueous leather treatment composition of Examples 3.1, which contained water-filled voided particles provided embossed coated leather having a combination of acceptable cling, acceptable print definition, and acceptable cutting. In contrast, the comparative aqueous leather treatment composition of Comparative C, which did not contain water-filled voided particles, provided a comparative embossed coated leather with less distinctness and sharpness, and with an unacceptable level of cutting.

What is claimed is:

1. An aqueous leather treatment composition comprising:

a) polymer particles selected from:

i) polyurethane polymer particles having a glass transition temperature of less than or equal to 20° C., ii) addition polymer particles having a glass transition temperature in the range of from −70° C. to 10° C., or iii) combinations thereof; and b) water-filled voided particles having an average particle diameter in the range of from 0.1 to 4 micron;

wherein said aqueous leather treatment composition has a ratio of dry weight of said polymer particles to dry weight of said water-filled voided particles in the range of from 19:1 to 3:2.

2. The aqueous leather treatment composition according to claim 1, wherein said aqueous leather treatment composition comprises:

a) said addition polymer particles, wherein said addition polymer particles comprise copolymerized carboxylic acid monomer; and b) at least one transition metal oxide, hydroxide, or carbonate in an amount greater than 0.2 equivalent of transition metal per equivalent of said copolymerized carboxylic acid monomer.

3. The aqueous leather treatment composition according to claim 1 wherein said addition polymer particles are multistage polymer particles comprising, based on dry weight of said multistage polymer particles:

a) 80 to 90 weight % of a predominately (meth)acrylic first polymer with a glass transition temperature in the range of from −70° C. to zero ° C.; and b) 10 to 20 weight % of a second polymer having a glass transition temperature of at least 20° C.

4. The aqueous leather treatment composition according to claim 1 further comprising from 5 to 30 weight % of additional polymer particles having a glass transition temperature in the range of from 40° C. to 150° C., based on total weight of said polymer particles and said additional polymer particles.

5. A method for preparing an embossed coated leather substrate, comprising the steps of:

a) applying an aqueous leather treatment composition to a leather substrate, wherein said aqueous leather treatment composition comprises:

i) polymer particles selected from:

A) polyurethane polymer particles having a glass transition temperature of less than or equal to 20° C., B) addition polymer particles having a glass transition temperature in the range of from −70° C. to 10° C., or C) combinations thereof; and ii) water-filled voided particles having an average particle diameter in the range of from 0.1 micron to 4 micron;

wherein said aqueous leather treatment composition has a ratio of dry weight of said polymer particles to dry weight of said water-filled voided particles in the range of from 19:1 to 3:2;

b) drying or allowing to dry said aqueous leather treatment composition that is applied to said leather substrate to provide a coated leather substrate having a coated surface;

c) contacting said coated surface of said coated leather substrate and an engraved surface;

d) applying pressure to interface of said coated surface in contact with said engraved surface; and e) removing from contact said engraved surface and said coated surface to provide said embossed coated leather substrate.

6. The method according to claim 5, wherein said aqueous leather treatment composition comprises:

a) said addition polymer particles, wherein said addition polymer particles comprise copolymerized carboxylic acid monomer; and b) at least one transition metal oxide, hydroxide, or carbonate in an amount greater than 0.2 equivalent of transition metal per equivalent of said copolymerized carboxylic acid monomer.

7. The method according to claim 5 wherein said addition polymer particles are multistage polymer particles comprising, based on dry weight of said multistage polymer particles:

a) 80 to 90 weight % of a predominately (meth)acrylic first polymer with a glass transition temperature in the range of from −70° C. to zero ° C.; and b) 10 to 20 weight % of a second polymer having a glass transition temperature of at least 20° C.

8. The method according to claim 5, wherein said aqueous leather treatment composition further comprises from 5 to 30 weight % of additional polymer particles having a glass transition temperature in the range of from 40° C. to 150° C., based on total weight of said polymer particles and said additional polymer particles.

9. The aqueous leather treatment composition according to claim 1, wherein said addition polymer particles have a glass transition temperature in the range of from −60° C. to 10° C.

10. The aqueous leather treatment composition according to claim 1, wherein said addition polymer particles have a glass transition temperature in the range of from −45° C. to 10° C.

11. The method according to claim 5, wherein said addition polymer particles have a glass transition temperature in the range of from −60° C. to 10° C.

12. The method according to claim 5, wherein said addition polymer particles have a glass transition temperature in the range of from −45° C. to 10° C.

* * * * *